United States Patent
Liu et al.

(10) Patent No.: US 12,471,406 B2
(45) Date of Patent: Nov. 11, 2025

(54) CONDUCTIVE SILVER PASTE FOR SINTERING BY LECO TECHNOLOGY, PREPARATION METHOD, ELECTRODE, AND BATTERY

(71) Applicant: SHANGHAI SILVER PASTE SCI. & TECH. CO., LTD., Shanghai (CN)

(72) Inventors: Jie Liu, Shanghai (CN); Mingfei Shu, Shanghai (CN); Xiaolong Chen, Shanghai (CN); Liang Wang, Shanghai (CN)

(73) Assignee: SHANGHAI SILVER PASTESCI. & TECH. CO., LTD., Shanghai (CN)

( * ) Notice: Subject to any disclaimer, the term of this patent is extended or adjusted under 35 U.S.C. 154(b) by 0 days.

(21) Appl. No.: 18/644,051

(22) Filed: Apr. 23, 2024

(65) Prior Publication Data
US 2025/0169223 A1    May 22, 2025

(30) Foreign Application Priority Data
Nov. 17, 2023 (CN) .......................... 202311533362.2

(51) Int. Cl.
*H10F 77/20* (2025.01)
(52) U.S. Cl.
CPC ................................. *H10F 77/211* (2025.01)

(58) Field of Classification Search
CPC ..................................................... H10F 77/211
See application file for complete search history.

(56) References Cited

U.S. PATENT DOCUMENTS 11,756,699 B1 * 9/2023 Chen ........................ C03C 8/04
    252/500

* cited by examiner

*Primary Examiner* — William D Young
(74) *Attorney, Agent, or Firm* — Cheng-Ju Chiang

(57) ABSTRACT

The present invention discloses conductive silver paste for sintering by LECO technology, a preparation method, an electrode, and a battery. The conductive silver paste comprises silver powder, glass powder, organic carrier, and inorganic additive; in weight percentage, the weight percentage contents of these components are: silver powder 84.0%-92.0%, glass powder 0.5%-3.0%; organic carrier 6.5%-13.5%; inorganic additive 0.2%-1.0%; wherein the glass powder comprises main glass powder, the main glass powder is glass powder containing Pb, O, and first main element, second main element, and third main element systems; the first main element comprises at least Si, the second main element comprises at least B, the third main element comprises at least Ag. An N-type TOPcon battery manufactured by the conductive silver paste of the present invention has characteristics of a high opening voltage and high photoelectric conversion efficiency.

5 Claims, No Drawings

CONDUCTIVE SILVER PASTE FOR SINTERING BY LECO TECHNOLOGY, PREPARATION METHOD, ELECTRODE, AND BATTERY

CROSS REFERENCE TO RELATED APPLICATIONS

The present disclosure claims priority of Chinese patent application No. 202311533362.2 filed on Nov. 17, 2023. The entire content of this application is incorporated herein by reference.

TECHNICAL FIELD

The present invention relates to the technical field of solar batteries, and in particular, relates to a conductive silver paste for sintering by LECO technology, a preparation method, an electrode, and a battery.

BACKGROUND

With increasing shortage of fossil energy and increasing prominence of environmental pollution, problems brought by climate warming are becoming more and more severe, and sustainable development of new types of pollution-free energy and fuel projects has been widely and deeply studied in various countries. Solar batteries are effective tools for converting light energy into electricity using photovoltaic effect, and therefore have also undergone rapid development in recent years. Photoelectric conversion efficiency of solar batteries has also been greatly improved. With advancement of technology, the mainstream of solar batteries in the market is gradually transitioning from Se-perc single crystal batteries to N-type TOPcon batteries. In order to pursue further improvement in photoelectric conversion efficiency of batteries, LECO (Laser Enhanced Contact Optimization) sintering technology is gradually emerging in the market and used to replace traditional sintering technology for sintering N-type TOPcon batteries. Traditional sintering technology, due to the highest processing temperature exceeding 700° C., causes damage to batteries and leads to increasement in metal induced recombination, thereby reducing open circuit voltages and overall efficiency of batteries. Using LECO as sintering post-treatment reduces the contact sintering temperature, thereby achieving higher open circuit voltages and higher filling factor values in industrial TOPcon solar batteries. The LECO process involves using high-intensity laser pulses at a constant reverse voltage over 10V on the front surface of a solar battery, thereby resulting in a few amperes of current that greatly reduces contact resistance between semiconductor and metal electrodes. The LECO process not only can improve the average performance of solar batteries, but also allows overall fine-tuning of the entire process sequence, and achieves a more uniform contact resistivity, thereby achieving a narrower distribution of filling factors; it can be realized that the photoelectric conversion efficiency increases by 0.1% to 0.6%, which has important practical application value.

Although LECO technology is still in the experimental stage, developing electronic pastes matching it is an important step in achieving its application. In correspondence with LECO sintering technology, developing silver pastes that can meet requirements of use to replace traditional silver aluminum paste and realize further efficiency improvement of N-type TOPcon batteries has important research value and practical application value, and is also an urgent task encountered in the development process of N-type TOPcon batteries.

SUMMARY OF THE DISCLOSURE

In order to overcome the shortcomings and deficiencies existing in the prior art, a purpose of the present invention is to provide a conductive silver paste for sintering by LECO technology, a preparation method, an electrode, and a battery, which will meet requirements for electrode materials of development of new types of N-type TOPcon batteries sintered by LECO technology, and has the characteristics of high open circuit voltages and high photoelectric conversion efficiency.

The purpose of the present invention is realized by the following technical solutions.

A conductive silver paste for sintering by LECO technology, wherein the conductive silver paste comprises silver powder, glass powder, organic carrier, and inorganic additive; in weight percentage, the weight percentage contents of these components are: silver powder 84.0%-92.0%, glass powder 0.5%-3.0%; organic carrier 6.5%-13.5%; inorganic additive 0.2%-1.0%; wherein the glass powder comprises main glass powder, the main glass powder is glass powder containing Pb, O, and first main element, second main element, and third main element systems; the first main element comprises at least Si, the second main element comprises at least B, the third main element comprises at least Ag, and the main glass powder is glass powder in a Pb—Si—B—O—Ag structure system.

In one embodiment, the first main element further comprises Ge, the second main element further comprises Al or Ga, and the third main element further comprises Li, Na, or K; in the main glass powder, in mole percentage, the mole percentages corresponding to components are as follows: PbO 20.0%-45.0%; the sum of $SiO_2$ and $GeO_2$ 5.0%-50.0%; the sum of $B_2O_3$, $Al_2O_3$, and $Ga_2O_3$ 5.0%-30.0%; the sum of $Ag_2O$, $Li_2O$, $Na_2O$, and $K_2O$ 1.0%-25.0%; first modified additive 5.8%-25.0%; wherein the first modified additive comprises one or more of oxides of Mg, Ca, Ba, Sn, Bi, and Se, and compounds that can decompose to obtain the oxides during a process of manufacturing the main glass powder.

In one embodiment, the inorganic additive comprises silver composite additive and auxiliary additive.

In one embodiment, the silver composite additive is one or more of silver oxide, silver silicate, silver borate, and silver selenate, and the auxiliary additive is one or more of aluminum powder, lead powder, zinc powder, silicon magnesium alloy powder, boron powder, silicon powder, silicon boride powder, silicon nitride, boron nitride, aluminum boride, zinc oxide powder, bismuth oxide powder, and silicon dioxide powder.

In one embodiment, the glass powder further comprises auxiliary glass powder, the auxiliary glass powder is glass powder in a Pb—Si—B—Zn—O—Li structure system, and the content of the auxiliary glass powder does not exceed 40% of the total weight of the glass powder.

In one embodiment, in the auxiliary glass powder, in mole percentage, the mole percentages corresponding to components are as follows: PbO 1.0%-15.0%; $SiO_2$ 25.0-50.0%; $B_2O_3$ 5.0%-15.0%; ZnO 5.0%-35.0%; $Li_2O$ 8.0%-25.0%; second modified additive 0.0%-15.0%.

In one embodiment, the organic carrier comprises organic solvent, organic resin, and carrier additive; the organic solvent is one or more of dodecanol ester, diethylene glycol butyl ether acetate, ethylene glycol butyl ether phthalate, diethylene glycol butyl ether, and pentaerythritol triacrylate; the organic resin is one or more of SEPS resin, polyvinyl butyral resin, acrylic resin, and hydroxyethyl cellulose; the carrier additive is one or more of silicone oil, palmitic acid, polyamide wax, or hydrogenated castor oil; in the organic carrier, in weight percentage, the weight percentage contents of these components are: organic solvent 60.0%-85.0%; organic resin 5.0%-30.0%; carrier additive 2.0%-15.0%.

The present invention further provides a method for preparing the aforesaid conductive silver paste for sintering by LECO technology, the method comprises the following steps.

Preparing glass powder: weighing raw materials of glass powder according to a set ratio; mixing, then through melting at a high temperature of 750° C.-1250° C., lowering the temperature, cooling down, drying, and crushing processes, thereby obtaining glass powder.

Preparing organic carrier: weighing raw materials of organic carrier according to a set ratio; heating, stirring, and mixing them; dispersing them uniformly through high-speed centrifugation, and then filtering them to obtain organic carrier.

Preparing conductive silver paste: adding prepared silver powder, the glass powder, and inorganic additive into the prepared organic carrier respectively according to a mass ratio, mixing them and stirring them uniformly, and then grinding them, adjusting their viscosity, and filtering them to obtain required conductive silver paste.

The present invention further provides an electrode, the electrode is obtained by sintering the aforesaid conductive silver paste by LECO technology.

The present invention further provides a battery comprising the aforesaid electrode.

Advantageous effects of the present invention are as follows.

(1) In comparison between the glass powder of the conductive silver paste of the present invention and glass powder of traditional N-type TOPcon silver aluminum paste, the present invention reduces the total content of glass powder, increases the content of B and Si elements and reduces the content of Pb element in the main glass powder, and uses Ag element as the network outer body of the glass; aluminum powder has reduced used amount or is not used at all. Thus, the degree of damage to surfaces of batteries caused by glass powder or low-temperature aluminum liquid during the pre-sintering process in the early stage of LECO technology treatment is reduced, and opening voltages of the batteries are improved. In the LECO technology stage, the low content of Pb in the main glass powder, at the same time of ensuring sufficient corrosion to insulation films on surfaces of batteries, reduces damage to PN junctions in batteries caused by instantaneous high temperature of laser. The increasement of the use of B and Si in the main glass powder can well enhance silver carrying capacity of the main glass powder, and promote good silver-silicon contact forming at battery interfaces. Ag element is used as the network outer body of the main glass powder, active silver loading and silver precipitation of the main glass powder is achieved, the formation of silver-silicon contact is further promoted, and it is ensured that good metallization contact is achieved in the case of low aluminum powder content; thus, at the same time of achieving good contact effect, the opening voltages of batteries are improved. Compared with traditional silver aluminum paste, in silver paste of the present invention, decrement of used content of glass powder, and used amount's decrement or no addition at all of aluminum powder reduce metal composite on surfaces of batteries caused by sintering on the surfaces of batteries, therefore short-circuit current of batteries is improved, and improvement of photoelectric conversion efficiency of batteries is promoted.

(2) The present invention selectively uses the auxiliary glass powder, and by the introduction of an appropriate amount of low lead glass, can further control flow behavior of the main glass powder during sintering, and further control action effect between glass and insulating films on surfaces of batteries. At the same time, the low-lead auxiliary glass powder has a higher softening point and a higher melting viscosity, and can be well retained among silver particles in a pre-sintering stage. In the LECO stage, it promotes sintering of a silver layer, improves a sintering density of the silver layer, reduces a grid line resistance, and assists in improving photoelectric conversion efficiency of batteries.

(3) The present invention further adds a small amount of inorganic additive, and the inorganic additive is divided into silver composite additive and auxiliary additive. The silver composite additive is essential additive, and is one or more of silver oxide, silver silicate, silver borate, and silver selenate. The auxiliary additive is selective additive, and is one or more of these substances: aluminum powder, lead powder, zinc powder, silicon magnesium alloy powder, boron powder, silicon powder, silicon boride powder, silicon nitride, boron nitride, aluminum boride, zinc oxide powder, bismuth oxide powder, and silicon dioxide powder. Among them, the use of the silver composite additive can promote formation of silver alloy or reduce energy for forming silver silicon alloy on the interface. The auxiliary additive can interact with the glass powder or promote reaction between the glass powder and silver, interfere and change the flow state of the glass powder and its flow rate in the silver layer. This can improve sintering effect of the silver layer, and further enhance density and contact effect of silver grid lines.

In summary, the silver paste of the present invention fully utilizes characteristics of sintering conditions of new LECO technology process, develops glass powder in a suitable system and inorganic additive, meets requirements of new sintering process, and develops conductive silver paste used for N-type TOPcon batteries that is suitable for sintering by the new LECO technology process. The conductive silver paste of the present invention has a high open circuit voltage, high short-circuit current, and photoelectric conversion efficiency improved by 0.3% to 0.6% compared with traditional silver aluminum paste.

DETAILED DESCRIPTION

The following embodiments are used to illustrate the present invention, but are not intended to limit the scope of the present invention. The terms "first", "second" and the like in the specification and claims of the present invention are used to distinguish similar objects.

The "scope" disclosed in this disclosure is in the form of lower and upper limits. They can be one or more lower limits and one or more upper limits, respectively. A given range is limited by selecting a lower limit and an upper limit. The selected lower limit and upper limit restrict boundaries of a specific range. All ranges that can be limited in this way are inclusive and combinable, that is, any lower limit can be combined with any upper limit to form a range. For example, a range of 60-120 and 80-110 is listed for specific parameters, which is understood as a range of 60-110 and 80-120 being also expected. In addition, if the minimum range values 1 and 2 are listed, and if the maximum range values 3, 4, and 5 are listed, the following ranges can be all expected: 1-3, 1-4, 1-5, 2-3, 2-4, and 2-5. In the present invention, unless otherwise specified, all embodiments and preferred embodiments mentioned herein may be combined to form new technical solutions.

The present invention provides a conductive silver paste for sintering by LECO technology, the conductive silver paste includes silver powder, glass powder, organic carrier, and inorganic additive; in weight percentage, the weight percentage contents of these components are: silver powder 84.0%-92.0%, glass powder 0.5%-3.0%; organic carrier 6.5%-13.5%; inorganic additive 0.2%-1.0%; wherein the glass powder includes main glass powder, the main glass powder is glass powder containing Pb, O, and first main element, second main element, and third main element systems; the first main element includes at least Si, the second main element includes at least B, the third main element includes at least Ag, and the main glass powder is glass powder in a Pb—Si—B—O—Ag structure system. In this embodiment, the silver powder is spherical silver powder with a particle size distribution range of 0.2-4.5 μm and a D50 distribution range of 0.9-1.5 μm; both the glass powder and the inorganic additive are in powder forms, with a particle size distribution range of 0.1-8.5 μm and a D50 distribution range of 0.7-2.5 μm; the content of Pb element oxides, calculated as PbO, does not exceed 45% of the total molar percentage of oxides in components of the main glass powder.

Specifically, in comparison between the glass powder of the conductive silver paste of the present invention and glass powder of traditional N-type TOPcon silver aluminum paste, the present invention reduces the total content of glass powder, increases the content of B and Si elements and reduces the content of Pb element in the main glass powder, and uses Ag element as the network outer body of the glass; aluminum powder has reduced used amount or is not used at all. Thus, the degree of damage to surfaces of batteries caused by glass powder or low-temperature aluminum liquid during the pre-sintering process in the early stage of LECO technology treatment is reduced, and opening voltages of the batteries are improved. In the LECO technology stage, the low content of Pb in the main glass powder, at the same time of ensuring sufficient corrosion to insulation films on surfaces of batteries, reduces damage to PN junctions in batteries caused by instantaneous high temperature of laser. The increasement of the use of B and Si in the main glass powder can well enhance silver carrying capacity of the main glass powder, and promote good silver-silicon contact forming at battery interfaces. Ag element is used as the network outer body of the main glass powder, active silver loading and silver precipitation of the main glass powder is achieved, the formation of silver-silicon contact is further promoted, and it is ensured that good metallization contact is achieved in the case of low aluminum powder content; thus, at the same time of achieving good contact effect, the opening voltages of batteries are improved. Compared with traditional silver aluminum paste, in silver paste of the present invention, decrement of used content of glass powder, and used amount's decrement or no addition at all of aluminum powder reduce metal composite on surfaces of batteries caused by sintering on the surfaces of batteries, therefore short-circuit current of batteries is improved, and thus improvement of photoelectric conversion efficiency of batteries is promoted.

As an implementation manner, the first main element further includes Ge, the second main element further includes Al or Ga, and the third main element further includes Li, Na, or K; in the main glass powder, in mole percentage, the mole percentages corresponding to components are as follows: PbO 20.0%-45.0%; the sum of $SiO_2$ and $GeO_2$ 5.0%-50.0%; the sum of $B_2O_3$, $Al_2O_3$, and $Ga_2O_3$ 5.0%-30.0%; the sum of $Ag_2O$, $Li_2O$, $Na_2O$, and $K_2O$ 1.0%-25.0%; first modified additive 5.8%-25.0%.

Among them, the first modified additive includes one or more of oxides of Mg, Ca, Ba, Sn, Bi, and Se, and compounds that can decompose to obtain the oxides during a process of manufacturing the main glass powder. Of course, Pb, the first main element, the second main element, and the third main element can be introduced by oxides of corresponding elements, and can also be introduced by compounds that decompose to obtain oxides of these elements during a process of manufacturing the main glass powder, for example, Li can be introduced by $Li_2CO_3$, Na can be introduced by $Na_2CO_3$, K can be introduced by $K_2CO_3$.

Specifically, in this embodiment, Si can be partially replaced by Ge, B can be partially replaced by Al or Ga, Ag can be partially replaced by Li, Na, or K; the components of the main glass powder are oxides of these elements or compounds that can decompose into oxides of these elements, such as one or more of carbonates or complexes forming the oxides of these elements.

As an implementation manner, the inorganic additive comprises silver composite additive and auxiliary additive.

Furthermore, the silver composite additive is one or more of silver oxide, silver silicate, silver borate, and silver selenate, and the auxiliary additive is one or more of aluminum powder, lead powder, zinc powder, silicon magnesium alloy powder, boron powder, silicon powder, silicon boride powder, silicon nitride, boron nitride, aluminum boride, zinc oxide powder, bismuth oxide powder, and silicon dioxide powder. The use of the silver composite additive can promote formation of silver alloy or reduce energy for forming silver silicon alloy on the interface. The auxiliary additive can interact with the glass powder or promote reaction between the glass powder and silver, and change the flow state of the glass powder and its flow rate in the silver layer. This can improve sintering effect of the silver layer, and further enhance density and contact effect of silver grid lines.

As an implementation manner, the glass powder further includes auxiliary glass powder, the auxiliary glass powder is glass powder in a Pb—Si—B—Zn—O—Li structure system, and the content of the auxiliary glass powder does not exceed 40% of the total weight of the glass powder. The present invention selectively uses the auxiliary glass powder, and by the introduction of an appropriate amount of low lead glass, can further control flow behavior of the main glass powder during sintering, and further control action effect between glass and insulating films on surfaces of batteries. At the same time, the low-lead auxiliary glass powder has a higher softening point and a higher melting viscosity, and can be well retained among silver particles in a pre-sintering stage. In the LECO stage, it promotes sintering of a silver layer, improves a sintering density of the silver layer, reduces a grid line resistance, and assists in improving photoelectric conversion efficiency of batteries.

Furthermore, in the auxiliary glass powder, in mole percentage, the mole percentages corresponding to components are as follows: PbO 1.0%-15.0%; $SiO_2$ 25.0-50.0%; $B_2O_3$ 5.0%-15.0%; ZnO 5.0%-35.0%; $Li_2O$ 8.0%-25.0%; second modified additive 0.0%-15.0%.

Among them, the second modified additive is oxide containing one or more mixed element in Ba, Ca, Mg, Bi, and Al, and compound that decomposes to obtain the oxide of the element during a process of manufacturing the auxiliary glass powder. Of course, Pb, Si, B, Zn, and Li can be introduced by oxides of corresponding elements, and can also be introduced by compounds that decompose to obtain oxides of these elements during a process of manufacturing the auxiliary glass powder, for example, Li can be introduced by $Li_2CO_3$.

As an implementation manner, the organic carrier includes organic solvent, organic resin, and carrier additive; the organic solvent is one or more of dodecanol ester, diethylene glycol butyl ether acetate, ethylene glycol butyl ether phthalate, diethylene glycol butyl ether, and pentaerythritol triacrylate; the organic resin is one or more of SEPS resin, polyvinyl butyral resin, acrylic resin, and hydroxyethyl cellulose; the carrier additive is one or more of silicone oil, palmitic acid, polyamide wax, or hydrogenated castor oil; in the organic carrier, in weight percentage, the weight percentage contents of these components are: organic solvent 60.0%-85.0%; organic resin 5.0%-30.0%; carrier additive 2.0%-15.0%.

The present invention further provides a method for preparing the aforesaid conductive silver paste for sintering by LECO technology, the method comprises the following steps.

Preparing glass powder: weighing raw materials of glass powder according to a set ratio; mixing, then through melting at a high temperature, lowering the temperature, cooling down, drying, and crushing processes, thereby obtaining the glass powder.

Among them, the preparation of the glass powder includes preparation of main glass powder and preparation of auxiliary glass powder. Precursor raw materials of the main glass powder are weighed according to a set ratio, then ball-mixed for 10-40 minutes by a ball milling mixing method, and then sieving is performed; evenly mixed raw materials are screened out, and then melted at a high temperature of 750° C.-1250° C. for 20-60 minutes; after melting evenly, quick temperature lowering and cooling down processing is performed for the glass liquid, then through drying processing, and finally through crushing processing, required main glass powder is obtained. Precursor raw materials of the auxiliary glass powder are weighed according to a set ratio, then ball-mixed for 10-40 minutes by a ball milling mixing method, and then sieving is performed; evenly mixed raw materials are screened out, and then melted at a high temperature of 750° C.-1250° C. for 20-60 minutes; after melting evenly, quick temperature lowering and cooling down processing is performed for the glass liquid, then through drying processing, and finally through crushing processing, required auxiliary glass powder is obtained.

Preparing organic carrier: weighing raw materials of organic solvent, organic resin, and carrier additive of organic carrier according to a set ratio; heating, stirring, and mixing them; dispersing them uniformly through high-speed centrifugation, and then filtering them to obtain organic carrier.

Preparing conductive silver paste: adding prepared silver powder, the glass powder, and inorganic additive into the prepared organic carrier respectively according to a mass ratio, mixing them and stirring them uniformly, and then grinding them by three rolls, adjusting their viscosity, and filtering them to obtain required conductive silver paste.

The present invention further provides an electrode, the electrode is obtained by sintering the aforesaid conductive silver paste by LECO technology.

The present invention further provides a battery including the aforesaid electrode.

The following are explained in conjunction with specific embodiments.

Embodiments B01-B06 and T01-T06

Preparation of main glass powder and auxiliary glass powder: required glass powder is prepared according to the following method. Raw materials used in main glass powder and auxiliary glass powder are respectively calculated and weighed according to set formula, then the raw materials are ball-milled, mixed evenly, and added into a crucible, and the crucible is placed in a muffle furnace; they are melted at a high temperature of 750° C.-1250° C. for 20-60 minutes, after melting evenly, glass liquid is water-quenched or poured into a low-temperature tank to be quickly cooled into coarse glass powder; then the coarse glass powder is quickly dried, after drying, dried coarse glass particles are added into a disc mill and ground into primary glass powder in a disc gap of 50-200 microns; finally, the primary glass powder passes through a jet mill, and crushed under a pressure of 6-12 Mpa into required main glass powder and auxiliary glass powder with a particle size of 0.1-8.5 microns, which are respectively numbered as B01-B06 and T01-T06. Specific molar composition ratio of the main glass powder is as shown in Table 1, and specific molar composition ratio of the auxiliary glass powder is as shown in Table 2.

TABLE 1

Composition Table of Main Glass Powder (mol %)

| | No. | | | | | |
|---|---|---|---|---|---|---|
| | B01 | B02 | B03 | B04 | B05 | B06 |
| PbO | 45 | 20 | 27.5 | 39.6 | 36.8 | 42 |
| $SiO_2$ | 12.7 | 16.4 | 44 | 5 | 24.7 | 31.5 |
| $GeO_2$ | 2.3 | | 6 | | | |
| $B_2O_3$ | 12 | 27 | 5 | 23.5 | 9.8 | 18.5 |
| $Al_2O_3$ | 1.5 | | | | 1.5 | 1.2 |
| $Ga_2O_3$ | | 3 | | 2.9 | | |
| $Ag_2O$ | 3.3 | 17.5 | 16.5 | 9 | 6.3 | 1 |
| $Li_2CO_3$ | 2 | 5 | | | | |
| $Na_2CO_3$ | 1.2 | 2.5 | | | 0.9 | |
| $K_2CO_3$ | | | 1 | | | |
| MgO | 2 | | | | | |
| $CaCO_3$ | | | | 1.9 | | |
| $BaCO_3$ | | 3 | | | 7.5 | |
| ZnO | 18 | | | 4.9 | 12.5 | 5.8 |
| $Bi_2O_3$ | | 5.6 | | 13.2 | | |
| Total | 100 | 100 | 100 | 100 | 100 | 100 |

TABLE 2

Composition Table of Auxiliary Glass Powder (mol %)

| | No. | | | | | |
|---|---|---|---|---|---|---|
| | T01 | T02 | T03 | T04 | T05 | T06 |
| PbO | 1.0 | 3.0 | 15.0 | 10.2 | 12.0 | 4.8 |
| $SiO_2$ | 50.0 | 37.5 | 30.0 | 37.2 | 36.0 | 28.7 |
| $B_2O_3$ | 6.0 | 14.3 | 10.5 | 5.0 | 15.0 | 9.0 |

TABLE 2-continued

Composition Table of Auxiliary Glass Powder (mol %)

| | T01 | T02 | T03 | T04 | T05 | T06 |
|---|---|---|---|---|---|---|
| ZnO | 35.0 | 15.0 | 10.0 | 24.3 | 5.0 | 21.5 |
| $Li_2CO_3$ | 8.0 | 18.0 | 25.0 | 18.0 | 24.0 | 21.0 |
| $BaCO_3$ | | 10.2 | | | 3.0 | 8.0 |
| $CaCO_3$ | | | 4.0 | | | 3.0 |
| MgO | | 2.0 | 2.0 | | | 2.0 |
| $Bi_2O_3$ | | | | 1.3 | | |
| $Al_2O_3$ | | | 3.5 | 4.0 | 5.0 | 2.0 |
| Total | 100 | 100 | 100 | 100 | 100 | 100 |

Embodiments K01-K06

Preparation of organic carrier: raw materials of organic solvent (low surface tension types, high surface tension types), organic resin (high plasticity types, cellulose types), and carrier additive are weighed according to a set ratio. Afterwards, they are heated by water bath at 60-100° C., stirred, and mixed evenly. Then they are dispersed uniformly by centrifugation in a condition of 1000-3000 rpm and are filtered. Finally, they are stirred and mixed evenly again at a room temperature to obtain organic carrier, which is numbered as K01-K06. Specific weight composition ratio of the organic carrier K01-K06 is as shown in Table 3.

TABLE 3

Weight Composition Table of Organic Carrier (wt %)

| Organic carrier composition | Composition substance | K01 | K02 | K03 | K04 | K05 | K06 |
|---|---|---|---|---|---|---|---|
| Organic solvent | Dodecanol ester | 32.5 | 9.3 | 10.0 | 37.0 | 8.0 | |
| | Diethylene glycol monobutyl ether acetate | | 50.7 | 15.0 | | 38.0 | 29.1 |
| | Benzoic acid ethylene glycol butyl ether ester | 17.8 | | 20.0 | 12.0 | | 31.5 |
| | Diethylene glycol butyl ether | | | 20.0 | 16.0 | 17.5 | |
| | Pentaerythritol triacrylate | 34.7 | | 10.0 | 5.0 | 15.0 | 14.7 |
| Organic resin | SEPS resin | | 1.5 | | 18.0 | | |
| | Polyvinyl butyral resin | | 21.0 | 6.5 | 0.4 | 12.0 | 20.2 |
| | Acrylic resin | 1.5 | | | 6.0 | | |
| | Hydroxyethyl cellulose | 3.5 | 7.5 | 3.5 | | | |
| Carrier additive | Dimethylsilicone oil | 5.3 | 7.7 | 10.0 | | 9.5 | 3.3 |
| | Palmitic acid | | 2.3 | 3.0 | 2.3 | | |
| | Polyamide wax | 1.2 | | 1.0 | 1.8 | | |
| | Hydrogenated castor oil | 3.5 | | 1.0 | 1.5 | | 1.2 |
| | Total | 100 | 100 | 100 | 100 | 100 | 100 |

Embodiments P01-P15

Preparation of conductive silver paste: the organic carrier with a corresponding weight percentage mass is first weighed according to a set ratio; then prepared silver powder, the glass powder, and inorganic additive with corresponding weight percentage masses are respectively weighed, and respectively added into the prepared organic carrier according to a mass ratio; they are mixed and stirred evenly, then ground by three rolls, their viscosity is adjusted, and finally they are filtered to obtain required conductive silver paste, which is numbered as P01-P15. Specific weight percentage composition of the silver paste P01-P15 is as shown in FIG. 4.

TABLE 4

Weight Composition Table of Conductive Silver Paste in Embodiments (wt %)

| Composition | Silver powder (content) | Main glass powder (kind/content) | Auxiliary glass powder (kind/content) | Inorganic additive (kind/content) | Organic carrier (kind/content) |
|---|---|---|---|---|---|
| P01 | 84.0 | B05/2.0 + B02/1.0 | | Silver silicate powder/0.3 + Silicon magnesium alloy powder/0.3 | K01/12.4 |
| P02 | 84.0 | B04/2.0 | T01/0.7 + T03/0.3 | Silver silicate powder/0.3 | K02/12.7 |

TABLE 4-continued

Weight Composition Table of Conductive Silver Paste in Embodiments (wt %)

| Composition | Silver powder (content) | Main glass powder (kind/content) | Auxiliary glass powder (kind/content) | Inorganic additive (kind/content) | Organic carrier (kind/content) |
|---|---|---|---|---|---|
| P03 | 84.0 | B01/1.5 | T02/1.0 | Silver borate/0.3 + Lead powder/0.2 | K04/13 |
| P04 | 84.0 | B03/0.5 + B05/1.5 | T06/0.3 | Silver borate/0.2 | K01/13.5 |
| P05 | 86.5 | B01/0.5 | | Zinc powder/0.1 + Lead powder/0.2 + Borosilicate powder/0.2 + Silver selenate/0.5 | K03/12 |
| P06 | 89.5 | B03/2.1 | T04/0.2 + T05/0.7 | Aluminum powder/0.4 + Silicon magnesium alloy powder/0.2 + Silver selenate/0.1 + Zinc oxide/0.3 | K02/6.5 |
| P07 | 92.0 | B01/0.5 + B06/0.4 | T03/0.3 | Silver silicate powder/0.3 | K05/6.5 |
| P08 | 87.5 | B01/0.7 + B05/1.3 | T01/0.2 + T0.4/0.3 | Silver oxide/0.3 + Aluminum boride powder/0.3 | K06/9.4 |
| P09 | 89.3 | B04/2.0 | | Silver selenate/0.2 + Silicon powder/0.2 | K06/8.3 |
| P10 | 86.2 | B04/0.3 + B06/0.9 | T03/0.3 + T04/0.3 | Aluminum powder/0.2 + Silicon powder/0.2 + Silver oxide powder/0.4 + Silver borate/0.2 | K02/11 |
| P11 | 88.2 | B06/1.5 | | Boron powder/0.2 + Bismuth oxide powder/0.2 + Silicon dioxide powder/0.2 + Silver oxide/0.2 | K03/9.5 |
| P12 | 85.7 | B03/0.3 + B04/1.5 | T05/0.1 | Boron nitride/0.1 + Silver borate/0.5 | K05/11.8 |
| P13 | 86.1 | B02/0.3 + B04/1.0 + B06/1.1 | T06/0.3 | Aluminum powder/0.3 + Silver oxide/0.4 | K05/10.5 |
| P14 | 87.0 | B01/0.7 + B03/1.0 | T03/0.1 + T04/0.2 | Silver selenate/0.3 + Boron nitride powder/0.1 | K03/10.6 |
| P15 | 86.5 | B05/1.8 | T01/0.4 + T04/0.4 + T05/0.4 | Boron powder/0.2 + Zinc oxide powder/0.3 + Silver selenate/0.3 | K03/9.7 |

The conductive silver paste P01-P15 prepared in the aforesaid embodiments, in the same printing conditions, is respectively printed on N-type TOPcon batteries and sintered by LECO technology sintering, and finally electricity performance of sintered battery cells is tested. In order to visually compare effect of the present invention, the present invention selects the N-type TOPcon battery specific silver aluminum paste 995PFB sold on the market by Shanghai Silver Paste Science and Technology Co., Ltd. as a compared product. The compared product is respectively printed on N-type TOPcon batteries in the same printing conditions, wherein two groups of battery cells are printed, one group is sintered by LECO technology sintering, and the sintered battery cells are marked as 995PFB-1; the other group is sintered by traditional sintering methods, and the sintered battery cells are marked as 995PFB-2. Finally, electricity performance of the compared samples is tested in the same conditions, and all tested electricity performance data record is as shown in Table 5.

TABLE 5

Electricity Performance Test Data Table of Silver Paste of the Present Invention and Compared Silver Aluminum Paste

| | Paste No. | Opening voltage (V) | Short-circuit current (A) | Fill factor (%) | Conversion efficiency (%) |
|---|---|---|---|---|---|
| Compared examples | 995PFB-1 | 0.7183 | 13.642 | 84.28 | 25.02 |
| | 995PFB-2 | 0.7206 | 13.654 | 85.03 | 25.27 |
| Embodiments | P01 | 0.7248 | 13.671 | 85.07 | 25.59 |
| | P02 | 0.7251 | 13.678 | 85.01 | 25.62 |
| | P03 | 0.7249 | 13.675 | 85.03 | 25.61 |
| | P04 | 0.7253 | 13.681 | 85.12 | 25.66 |
| | P05 | 0.7259 | 13.689 | 85.06 | 25.71 |
| | P06 | 0.7249 | 13.681 | 85.09 | 25.69 |
| | P07 | 0.7267 | 13.687 | 85.06 | 25.85 |
| | P08 | 0.7265 | 13.683 | 85.01 | 25.81 |
| | P09 | 0.7259 | 13.676 | 85.05 | 25.76 |
| | P10 | 0.7267 | 13.686 | 85.15 | 25.87 |
| | P11 | 0.7257 | 13.671 | 85.04 | 25.73 |
| | P12 | 0.7265 | 13.676 | 85.08 | 25.77 |
| | P13 | 0.7269 | 13.673 | 85.11 | 25.79 |
| | P14 | 0.7268 | 13.685 | 85.07 | 25.84 |
| | P15 | 0.7266 | 13.681 | 85.01 | 25.80 |

From Table 5, it can be known that: by comparing the embodiments P01-P15 of the present invention with the product 995PFB sold on the market, and by comparing the cases that the silver aluminum paste 995PFB-1 is sintered by LECO technology with that 995PFB-2 is sintered by tradition, it is found that the traditional silver aluminum paste, after improving the sintering method, does not cause increasement of photoelectric conversion efficiency of batteries, on the contrary, the efficiency is lowered. This indicates that traditional silver aluminum paste cannot meet the requirement of using LECO technology sintering to improve photoelectric conversion efficiency of N-type TOPcon. Compared with the silver aluminum paste 995PFB-2 sintered by the traditional sintering method, it is found that the silver paste of the present invention has significant improvement in an opening voltage, significant improvement in short-circuit current, and significant improvement in photoelectric conversion efficiency (up to 0.3%-0.6%) than 995PFB-2. This indicates that the silver paste of the present invention fully utilize characteristics of sintering conditions of new LECO technology process, develops glass powder in suitable systems and inorganic additive, meets requirements of new sintering process, develop silver paste used for N-type TOPcon batteries that is suitable for sintering by new LECO technology process, and improve opening voltages and short-circuit currents of batteries. The silver paste of the present invention, in combination with new LECO technology sintering process, can achieve that photoelectric conversion efficiency of N-type TOPcon batteries is improved by 0.3%-0.6% compared with traditional silver aluminum paste.

The above described are only preferred embodiments of the present invention and does not impose any formal limitation on the present invention. Although the present invention has been disclosed above with preferred embodiments, it is not intended to limit the present invention. Any technical personnel familiar with the specialty, within a scope that does not deviate from technical solutions of the present invention, can utilize the technical content disclosed above to make certain changes or modifications, which are equivalently changed equivalent embodiments. Any simple modifications, equivalent changes, or modifications made to the above embodiments based on the technical essence of the present invention, as long as they are not separated from the content of the technical solutions of the present invention, shall still fall within the protection scope of the technical solutions of the present invention.

What is claimed is:

1. A conductive silver paste for sintering by LECO technology, wherein the conductive silver paste comprises silver powder, glass powder, organic carrier, and inorganic additive;

in weight percentage, the weight percentage contents of these components are: silver powder 84.0%-92.0%, glass powder 0.5%-3.0%; organic carrier 6.5%-13.5%; inorganic additive 0.2%-1.0%;

wherein the glass powder comprises main glass powder, the main glass powder is glass powder containing Pb, O, and first main element, second main element, and third main element systems; the first main element comprises at least Si, the second main element comprises at least B, the third main element comprises at least Ag, and the main glass powder is glass powder in a Pb—Si—B—O—Ag structure system;

the first main element further comprises Ge, the second main element further comprises Al or Ga, and the third main element further comprises Li, Na, or K;

in the main glass powder, in mole percentage, the mole percentages corresponding to components are as follows: PbO 20.0%-45.0%; the sum of $SiO_2$ and $GeO_2$ 5.0%-50.0%; the sum of $B_2O_3$, $Al_2O_3$, and $Ga_2O_3$ 5.0%-30.0%; the sum of $Ag_2O$, $Li_2O$, $Na_2O$, and $K_2O$ 1.0%-25.0%; first modified additive 5.8%-25.0%;

wherein the first modified additive comprises one or more of oxides of Mg, Ca, Ba, Sn, Bi, and Se, and compounds that can decompose to obtain the oxides during a process of manufacturing the main glass powder;

the inorganic additive comprises silver composite additive and auxiliary additive;

the silver composite additive is one or more of silver oxide, silver silicate, silver borate, and silver selenate, and the auxiliary additive is one or more of aluminum powder, lead powder, zinc powder, silicon magnesium alloy powder, boron powder, silicon powder, silicon boride powder, silicon nitride, boron nitride, aluminum boride, zinc oxide powder, bismuth oxide powder, and silicon dioxide powder.

2. The conductive silver paste for sintering by LECO technology according to claim 1, wherein the glass powder further comprises auxiliary glass powder, the auxiliary glass powder is glass powder in a Pb—Si—B—Zn—O—Li structure system, and the content of the auxiliary glass powder does not exceed 40% of the total weight of the glass powder.

3. The conductive silver paste for sintering by LECO technology according to claim 2, wherein in the auxiliary glass powder, in mole percentage, the mole percentages corresponding to components are as follows: PbO 1.0%-15.0%; $SiO_2$ 25.0-50.0%; $B_2O_3$ 5.0%-15.0%; ZnO 5.0%-35.0%; $Li_2O$ 8.0%-25.0%; second modified additive 0.0%-15.0%.

4. The conductive silver paste for sintering by LECO technology according to claim 1, wherein the organic carrier comprises organic solvent, organic resin, and carrier additive;

the organic solvent is one or more of dodecanol ester, diethylene glycol butyl ether acetate, ethylene glycol butyl ether phthalate, diethylene glycol butyl ether, and pentaerythritol triacrylate;

the organic resin is one or more of SEPS resin, polyvinyl butyral resin, acrylic resin, and hydroxyethyl cellulose;

the carrier additive is one or more of silicone oil, palmitic acid, polyamide wax, or hydrogenated castor oil;

in the organic carrier, in weight percentage, the weight percentage contents of these components are: organic solvent 60.0%-85.0%; organic resin 5.0%-30.0%; carrier additive 2.0%-15.0%.

5. A method for preparing the conductive silver paste for sintering by LECO technology according to claim 1, wherein the method comprises the following steps:

preparing glass powder: weighing raw materials of glass powder according to a set ratio; mixing, then through melting at a high temperature of 750° C.-1250° C., lowering the temperature, cooling down, drying, and crushing processes, thereby obtaining glass powder;

preparing organic carrier: weighing raw materials of organic carrier according to a set ratio; heating, stirring, and mixing them; dispersing them uniformly through high-speed centrifugation, and then filtering them to obtain organic carrier;

preparing conductive silver paste: adding prepared silver powder, the glass powder, and inorganic additive into the prepared organic carrier respectively according to a mass ratio, mixing them and stirring them uniformly, and then grinding them, adjusting their viscosity, and filtering them to obtain required conductive silver paste.

* * * * *